United States Patent Office 3,441,086
Patented Apr. 29, 1969

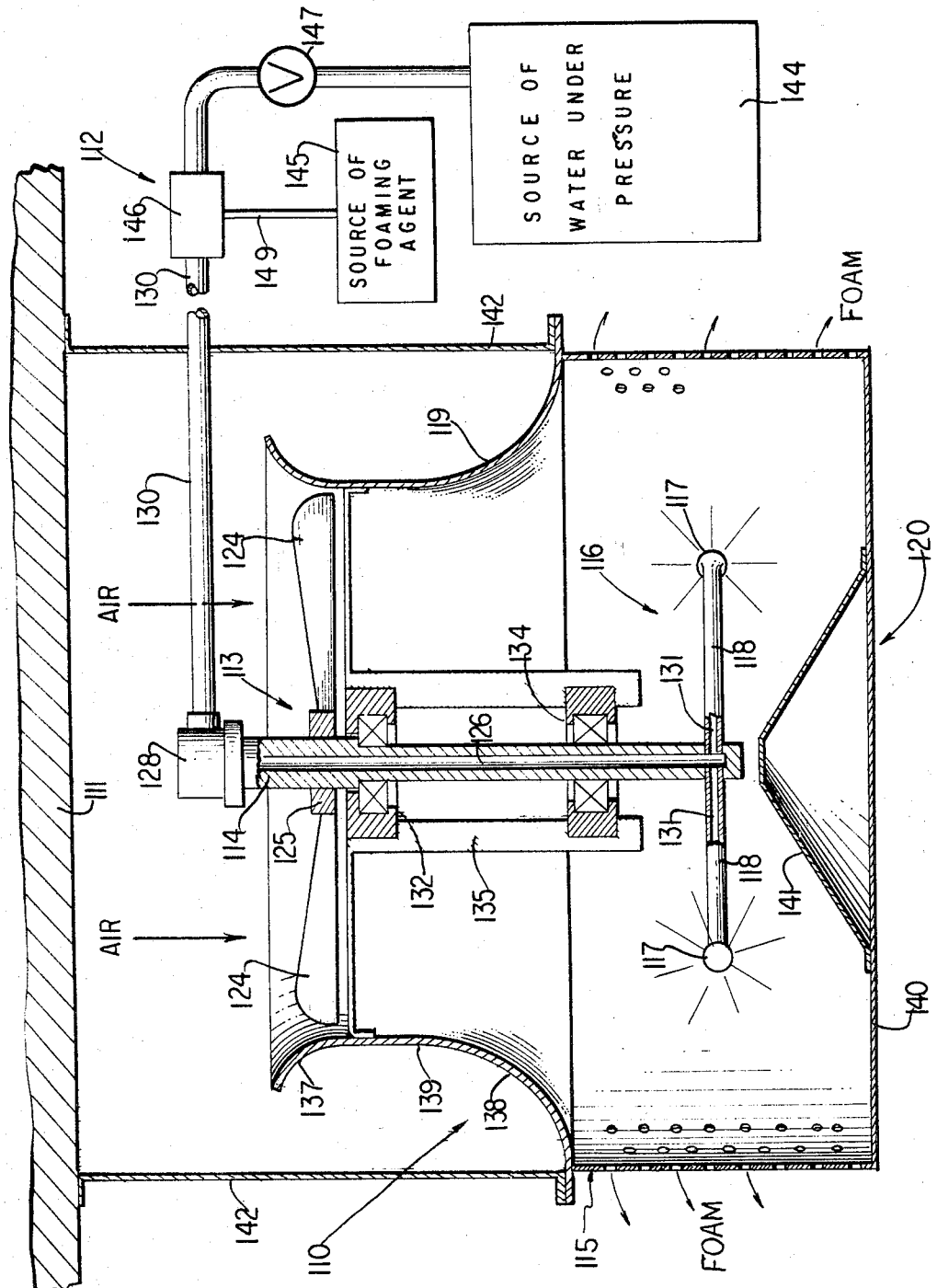

3,441,086
FOAM GENERATOR WITH WATER POWERED
AXIAL FLOW FAN
Robert W. Barnes, Scotch Plains, N.J., assignor, by mesne assignments, to Walter Kidde & Company, Inc., Belleville, N.J., a corporation of New York
Filed June 19, 1967, Ser. No. 646,941
Int. Cl. A62c 35/44, 35/16
U.S. Cl. 169—15                6 Claims

ABSTRACT OF THE DISCLOSURE

Fire fighting foam generating apparatus, which includes a thin cylindrical perforated member for forming foam, an imperforate annular casing secured to one end of the perforated member to form an air inlet, a circular imperforate end wall secured to the other end of the perforated member, a shaft extending longitudinally from the area enclosed by the inlet casing into the area enclosed by the perforated member, a source of foam producing solution under pressure, a plurality of nozzles connected to the solution source and mounted on the shaft within the area enclosed by the perforate member to spray the solution onto the perforate member and drive the shaft by reactive forces, and an axial flow fan mounted on the shaft within the area enclosed by the inlet casing to rotate with the shaft and move air from the inlet through the perforated wall to become entrained with the solution and form foam.

BACKGROUND OF THE INVENTION

Field of the invention

The present invention relates to high expansion fire fighting foam generating apparatus, and, more particularly, to such apparatus wherein a foaming solution under pressure is sprayed through reaction nozzles to simultaneously wet a perforate foam forming wall member and drive a fan to induce air flow through the perforate wall member to produce foam.

The prior art

This invention is an improvement upon the Water-Powered Fire-Fighting Foam Generator disclosed in co-pending United States patent application Ser. No. 595,983, filed Nov. 21, 1966, now Patent No. 3,393,745, assigned to the assignee of this application.

The foam generator described in the aforementioned prior application employs a centrifugal fan driven by reaction nozzles mounted at the outer edge of the fan rotor to produce a tangential spray, and a cylindrical foam forming net, concentric with, and surrounding the centrifugal fan so that spray from the reaction nozzles wets the net and so that the air issuing from the fan flows through the net to be entrained with the solution to produce foam.

The combination of a reaction motor formed by tangentially oriented spray nozzles with a cylindrical net surrounding the reaction motor provides maximum conversion of available water power into rotary motion, and also provides uniform distribution of foam producing solution over the area of the net. The centrifugal type fan produces an even distribution of air over the net (without using energy absorbing diffusing baffles) which when combined with the uniformly distributed solution produces a uniform foam. However, a centrifugal fan has the disadvantages of being relatively large, heavy, and expensive.

In water powered foam generators, power is extracted only from that quantity of water which is thereafter incorporated into the foam. It is extremely important therefore that the greatest possible portion of the power available in this quantity of water be converted into uniform air movement through the foam forming member. If the rate of air flow through the foam forming member is not uniform over the entire surface of the net, the foam produced where the air flow is low will contain too much water, while the foam produced where the air flow is high will contain too little water. Foam containing too much water is heavy and has difficulty in flowing to a distant fire. Foam containing too little water is light and flows well but may not contain enough water to extinguish the fire. For maximum fire fighting capability all of the foam produced should have the proper water to air ratio and this can only be achieved if both the solution and the air are evenly distributed over the foam forming member.

While axial flow fans are smaller, lighter, and less expensive than centrifugal fans, they produce a column of unevenly distributed air. This type of fan has been used in the past in the conventional axial flow or wind tunnel type of foam generator such as that shown in United States Patent 3,241,617. The axial flow fan produces greater air velocity at the tips of the fan blades than at the inner portions of the fan blades which causes the column of air moved by the fan to have a greater rate of flow at the edges than in the center. In addition, this type of fan spins the air and thus imparts a radial component thereto which further increases the rate of flow at the edge of the column of moving air.

The velocity variations in the air column can be eliminated by spacing the fan and the net apart a considerable distance (e.g. 18 feet), which is excessive for most applications, in order to allow the air flow to redistribute itself. It has been found that highly uniform foam can be produced with axial flow foam generators of a size practical for most applications only if a perforated diffusing plate is placed between the fan and the net to redistribute the airflow.

In foam generators which are driven by gasoline or electric motors, the introduction of such a diffusing plate presents no problem since a more powerful motor can be used to compensate for the energy lost in forcing the air past the diffuser. In water power units a diffuser cannot be used because of the limited power available, therefore, in the past, all attempts to utilize an axial flow fan in water power foam generators have resulted in units in which the air flow through various portions of the foam forming net varies considerably resulting in the production of non-uniform foam of limited fire fighting capability.

Summary of the invention

An object of the present invention is to provide an inexpensive and simple construction water powered foam generator of minimum size and weight which derives the maximum effect from available water power and produces highly uniform foam over the entire area of the foam forming member.

Another object is to provide such a foam generator including an axial flow fan wherein uniform air flow through the foam forming member is achieved without loss of any of the energy imparted to the air by the fan.

Another object is to provide such a foam generator including an axial flow fan wherein substantially all of the energy transformed to the moving air is effectively used in making foam.

Another object is to provide such a foam generator utilizing a perforated metal cylindrical wall as both a foam forming member and a structural member.

Other and further objects of the invention will be obvious upon an understanding of the illustrative embodiment about to be described, or will be indicated in the appended claims, and various advantages not referred to herein will occur to one skilled in the art upon employment of the invention in practice.

The foregoing objects are generally accomplished by providing apparatus for producing fire fighting foam comprising an axial flow fan mounted to rotate about an axis and move air parallel to that axis, a circumferentially extending perforate foam forming wall member encircling the axis of the fan and defining a space, a scource of foam producing solution under pressure, nozzle means positioned in the volume for spraying the solution on the wall member and for driving the fan, and means for changing the axial flow of the air leaving the fan into a flow in all radial directions through the perforate wall member.

BRIEF DESCRIPTION OF THE DRAWING

A preferred embodiment of the invention has been chosen for purposes of illustration and description, and is shown in the accompanying drawings, forming a part of the specification, wherein:

The single figure of the drawing is a longitudinal cross-sectional view of a foam generator in accordance with the present invention.

DESCRIPTION OF THE PREFERRED EMBODIMENT

Referring to the drawing in detail, there is shown a water powered fire fighting foam generator 110 suspended from a ceiling 111 and connected to a source of foam producing solution 112 under pressure. The foam generator 110 includes an axial flow fan 113 mounted adjacent the upper end of a vertical shaft 114, a cylindrical perforated metal wall 115 concentric with the lower end of the shaft 114, a reaction motor 116 comprising a pair of reaction nozzles 117 mounted on arms 118 extending from the shaft 114 to spray the foam producing solution onto the wall 115 and to drive the shaft by the reaction forces produced by the spray, and a casing including an annular inlet member 119 and a lower wall member 120 for changing the vertical air flow produced by the fan 113 into horizontal radial flow through the perforated wall 115.

The axial flow fan 113 comprises a plurality of blades 124 mounted on a hub 125 rigidly secured to the shaft 115. The shaft 114 is provided with a central passageway 126 extending from the upper end to adjacent the lower end. A rotary union 128 is affixed to the upper end of the shaft 114, and the foam producing solution is conducted from the source 112 through a conduit 130 into the rotary union 128, and through the union into the passageway 126. The arms 118 are provided with passageways 131 connecting the nozzles 117 to the passageways 128.

The shaft 114 is journaled in an upper bearing 132 and a lower bearing 134 which are carried by a plurality of L shaped brackets 135 attached to the inner wall of the inlet member 119.

The annular inlet member 119 is formed of sheet metal and has an upper end section 137 provided with a slightly outward flare, a lower end section 138 provided with substantial outward flare, and a throat section 139 between the upper and lower end sections.

The cylindrical wall member 115 is of larger diameter than the fan 113 and is formed of a narrow sheet of perforated metal bent into a circular tube and secured to the outer periphery of the lower flared section 138. This sheet of metal is 0.03 inch in thickness and is provided 1/16 inch diameter holes so as to provide 30 percent open area.

The lower wall member 120 comprises an imperforate circular plate of sheet metal 140 having a diameter equal to the diameter of the cylindrical wall member 115, and a generally conical air deflector 141 secured at the center of the upper surface of the plate 140. The plate 140 is secured to and supported by the cylindrical wall 115 which is in turn supported by the inlet member 119.

The generator 110 is suspended from the ceiling 111 by a plurality of elongated brackets 142 attached to the edge of the lower flared section 138 of the inlet member 119.

The source 112 of foam producing solution under pressure includes a source of water under pressure, 144, a source of foaming agent 145, an inline proportioner 146, and a water flow rate control valve 147. The source of water under pressure 144 is connected through the valve 147 and the inline proportioner 146 to the conduit 130. The foaming agent from the source 145 is injected into the proportioner 146 through a conduit 149 to become mixed with the flowing water to produce the foaming solution. Any suitable foaming agent may be used which will generate a large mass of bubbles at the perforated wall 116. For example, 30% active ammonium lauryl sulphate dissolved in water in a proportion of about 15 percent active material by weight can be used as the agent in source 145. This agent when mixed with water in a proportion of about 3 percent by volume has been found to produce high expansion foam having a ratio of air to water on the order of about 1000 to 1 by volume.

The source 112 of foaming solution may be located at some distance from the foam generator 110 and may simultaneously supply a number of foam generators.

In operation, the valve 147 is opened, in response to a fire, either manually or by a fire detecting system to allow water to flow from the source 144 through the inline proportioner 147. The water flowing through the proportioner draws foaming agent from the source 145 and the agent is mixed with the water to produce the foaming solution. The foaming solution flows under pressure through the conduit 130, the rotary union 128, the passageway 126, and the passageways 131 to the nozzles 117. The solution is sprayed by the nozzles 117 onto the inner surface of the wall 115 and thus produces reaction forces which rotate the shaft 114 and the fan 113.

The nozzles 117 are designed to produce a narrow cone of water when they are stationary to provide maximum thrust, however, when the shaft 114 rotates, the spray fans out to uniformly wet the entire inner surface of wall 115 for the reasons described below.

All segments of this cone of water, except the segment travelling along the centerline of the nozzle opening, have a longitudinal velocity component parallel to the centerline of the nozzle opening, and a transverse velocity component perpendicular to the centerline of the nozzle. When the shaft 114 rotates, the speed at which the nozzles are moving is imparted to the water flowing through the nozzles and the absolute longitudinal velocity of the water as it leaves the nozzle is decreased by the speed of the nozzles (although the realtive velocity of the water with respect to the nozzles is unchanged). Since the absolute longitudinal velocity decreases, the transverse velocity has an increased effect upon the trajectory of the segments of the cone of water and the cone of water fans out to cover the entire vertical extent of the net.

The fan 113, driven by the reaction motor 116, draws air into the upper end 137 of the inlet member 119 and propels this air vertically downward through the inlet member throat section 139. The lower flared section 138 of the inlet member cooperates with the deflector 141 and the plate 140 to convert the axial air flow through the throat 139 into a horizontal flow in all radial directions, through the openings in the wall 115. The air flowing through the openings in the perforated wall 115 becomes entrained with the uniformly distributed solution to produce foam.

As previously mentioned, a charateristic of the axial flow type fan is that it spins the air it is moving and generates centrifugal forces which impart a radial component to the air. In the present invention, the foam forming wall is positioned radially outwardly of the axis of the fan so that this radial component is utilized in moving the air through the perforated wall 115. Therefore, this characteristic of the axial flow fan, which is detrimental in the wind tunnel type of construction, is utilized in the present invention to increase the effectiveness of the fan 113.

Another previously mentioned characteristic of the axial flow type fan is that it produces higher air velocities at the blade tips than at the inner portions of the blades. In the present invention, the combined effects of the interaction between the water spray and the air flow, the low open area of the perforate foam forming wall, and the change in direction of the air flow results in a completely uniform air flow through the perforate wall without requiring energy absorbing diffusers. This uniform air flow combines with the uniformly distributed foaming solution to produce uniform high quality foam over the entire surface of the perforate wall.

It will be seen that the present invention provides an inexpensive simply constructed water powered foam generator of minimum size and weight which evenly distributes a foaming solution over the foam forming member and converts the maximum amount of available water power in the solution used into uniform air movement through the foam forming member to produce highly uniform foam.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. Apparatus for producing fire fighting foam comprising an axial flow fan mounted to rotate about an axis and move air parallel to that axis, a circumferentially extending perforate foam forming wall member encircling the axis of said fan and defining a volume, a source of foam producing solution under pressure, nozzle means positioned in said volume for spraying the solution on said wall member and for driving said fan, and means for changing the axial flow of the air leaving said fan into a flow in all radial directions through said perforate wall member.

2. Apparatus according to claim 1 wherein said fan is carried by a rotatable shaft extending into said volume and said nozzles are carried by said shaft and positioned to spray the solution onto said perforate wall member in a manner to produce reaction forces to rotate said shaft.

3. Apparatus according to claim 2, wherein said flow changing means includes a flared inlet member surrounding said fan and abutting one end of said perforate wall member, and an imperforate wall member extending across the other end of said perforate wall member.

4. Apparatus according to claim 2 wherein said perforate wall is of larger diametrical extent than said fan whereby the radial component imparted to the air by the fan is utilized in delivering air to the perforate wall.

5. Apparatus according to claim 2 wherein said perforate wall member is perforated metal sheet to provide a fire resistant construction.

6. Apparatus according to claim 5 wherein said flow changing means includes an imperforate wall member extending across the end of said perforate wall member opposite said inlet and said perforated metal wall provides the structural supporting connection between said inlet member and said imperforate wall.

References Cited
UNITED STATES PATENTS
3,393,745   7/1968   Durstewitz _____ 169—15

M. HENSON WOOD, JR., *Primary Examiner.*

MICHAEL Y. MAR, *Assistant Examiner.*

U.S. Cl. X.R.

239—77, 251, 261, 304, 310, 504